RECORD MATERIAL FEEDING AND CONTROL EQUIPMENT

Original Filed March 11, 1953

INVENTORS
FRANK R. WERNER
KENNETH C. FLINT &
WALTER G. STERZER

BY Louis A Kline
Richard Van Busum

THEIR ATTORNEYS

RECORD MATERIAL FEEDING AND CONTROL EQUIPMENT
Original Filed March 11, 1953
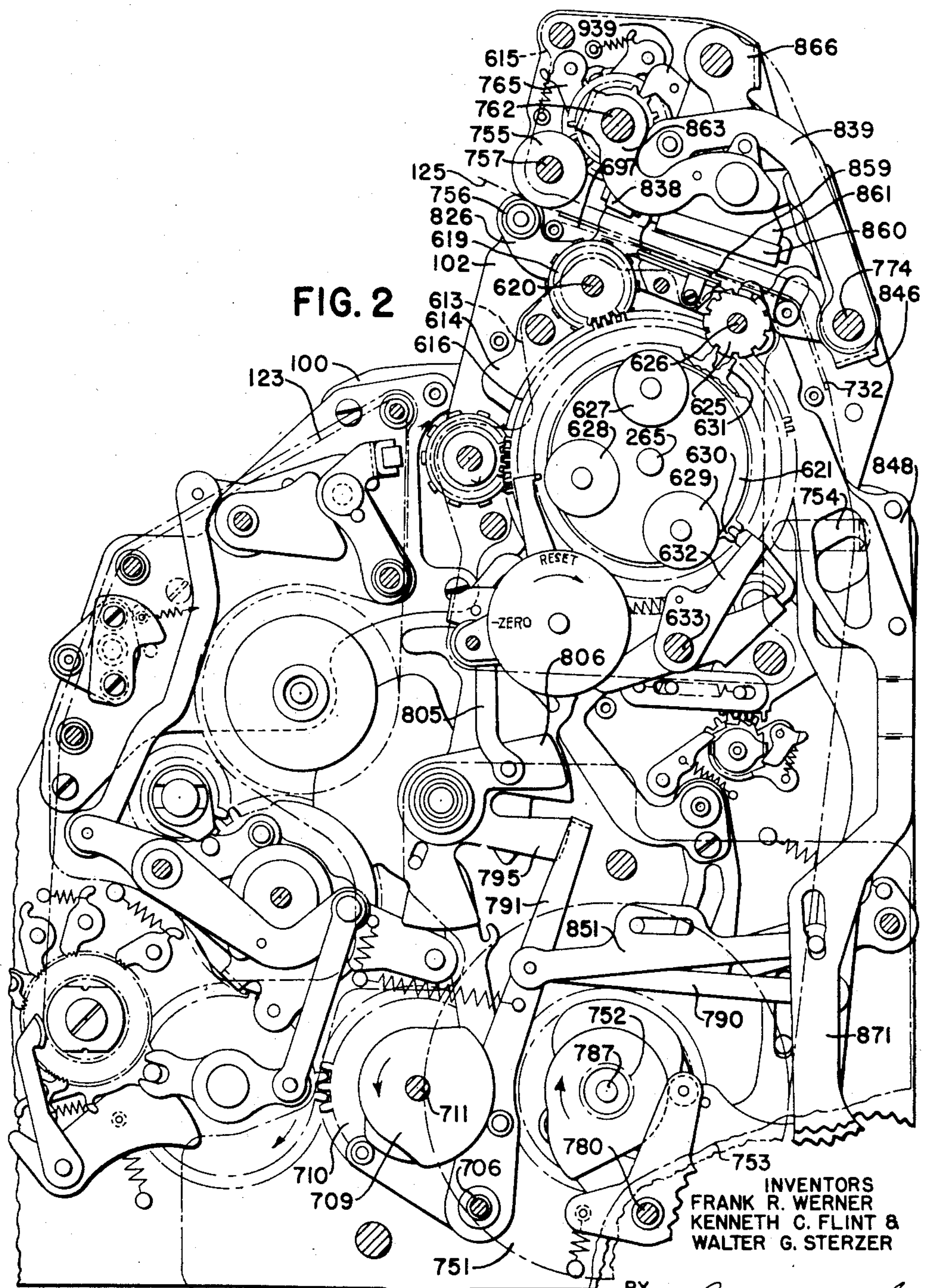
INVENTORS
FRANK R. WERNER
KENNETH C. FLINT &
WALTER G. STERZER
BY Louis A Kline
Richard Van Buren
THEIR ATTORNEYS Aug. 18, 1959 F. R. WERNER ET AL 2,899,893
RECORD MATERIAL FEEDING AND CONTROL EQUIPMENT
Original Filed March 11, 1953 5 Sheets-Sheet 3
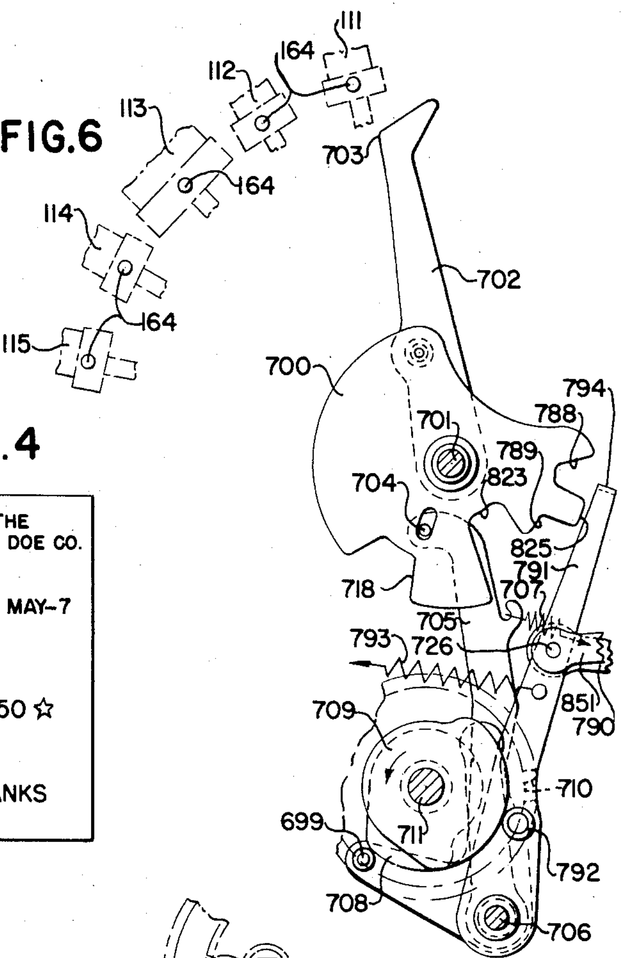
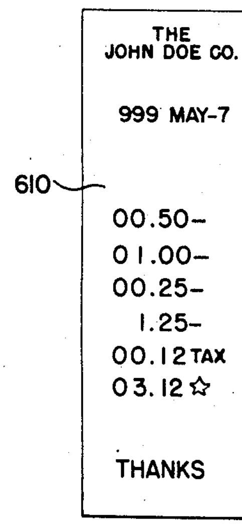
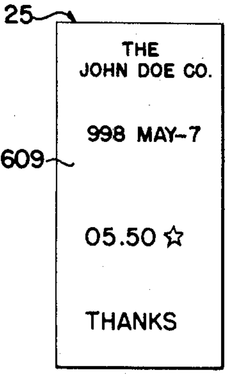
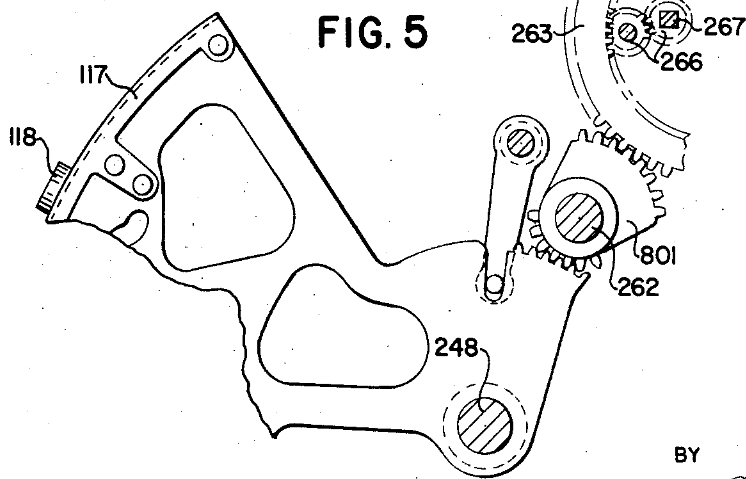
INVENTORS
FRANK R. WERNER
KENNETH C. FLINT &
WALTER G. STERZER
BY Louis A. Kline
Richard Van Busum
THEIR ATTORNEYS

RECORD MATERIAL FEEDING AND CONTROL EQUIPMENT

Original Filed March 11, 1953 5 Sheets-Sheet 4

INVENTORS
FRANK R. WERNER
KENNETH C. FLINT &
WALTE.' G. STERZER

BY Louis A Kline
Richard Van Busum
THEIR ATTORNEYS

RECORD MATERIAL FEEDING AND CONTROL EQUIPMENT
Original Filed March 11, 1953 5 Sheets-Sheet 5
FIG. 10
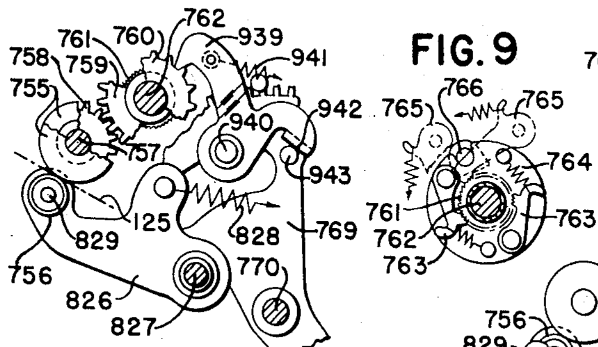
FIG. 9
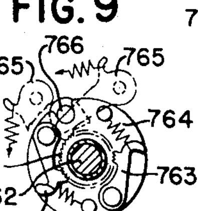
FIG. 8
FIG. 11
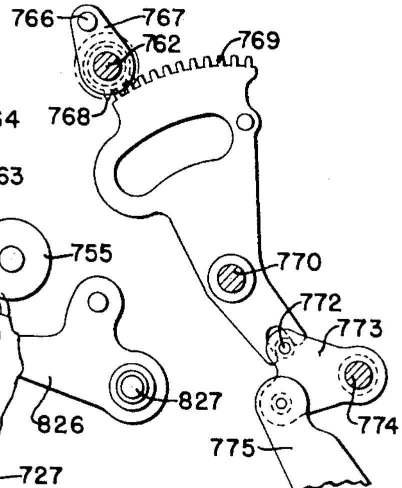
FIG. 12
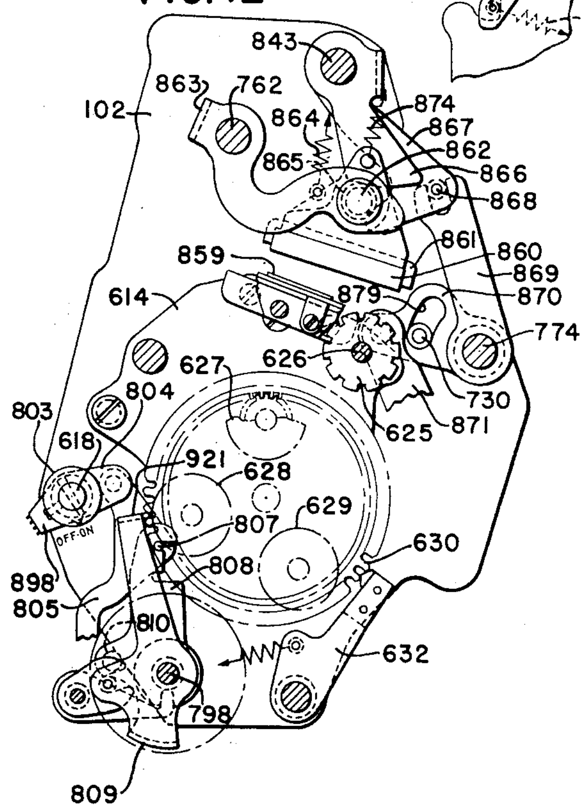
FIG. 13
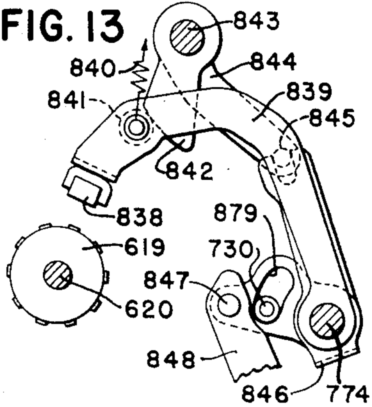
INVENTORS
FRANK R. WERNER
KENNETH C. FLINT &
WALTER G. STERZER
BY Louis A. Kline
Richard Van Busum
THEIR ATTORNEYS United States Patent Office 2,899,893

Patented Aug. 18, 1959

1

2,899,893

RECORD MATERIAL FEEDING AND CONTROL EQUIPMENT

Frank R. Werner, Dayton, Kenneth C. Flint, West Carrollton, and Walter G. Sterzer, Dayton, Ohio, assignors to The National Cash Register Company, Dayton, Ohio, a corporation of Maryland Original application March 11, 1953, Serial No. 341,633. Divided and this application July 24, 1958, Serial No. 750,658

5 Claims. (Cl. 101—93)

This invention relates to accounting machines and cash registers, and is particularly directed to the record-material-feeding mechanism and the controlling mechanism therefor, of such machines, and more particularly to the type of machine disclosed in the co-pending application for Letters Patent of the United States, Serial No. 341,633, filed March 11, 1953, by Frank R. Werner et al., of which the present application is a division.

It is the general object of this invention to provide a compact and efficient cash register of economical construction, having many of the appointments and features of larger and more costly machines.

Another object is the provision of improved means for controlling the operation of the recording mechanism in different types of operations.

A further object is to provide improved means for controlling the operation of the receipt-feeding means and the receipt-printing hammers and their operating mechanisms.

Still another object is the provision of improved means for feeding the receipt record material and for controlling the operation of said feeding means.

With these and incidental objects in view, the invention includes certain novel features of construction and combinations of parts, a preferred form or embodiment of which is hereinafter described with reference to the drawings which accompany and form a part of this specification.

In the drawings:

Fig. 2 is a right side elevation of the machine taken just inside the cabinet, showing in particular the mechanism for printing records on a detail strip, which is retained in the machine, and on an issuing receipt, which is issued at the end of each item transaction.

Fig. 3 is a facsimile of a multiple-item receipt prepared on the machine of this invention.

Fig. 4 is a facsimile of a single-item receipt prepared on the machine of this invention.

Fig. 5 is a fragmentary detail view of the total control lever, sometimes referred to as "unit lock lever," for controlling the various functions of the machine.

Fig. 6 is a right side elevation of the operating and control mechanisms for the receipt-feeding means.

Fig. 8 is a detail view of a part of the receipt-feeding mechanism.

Fig. 9 is a detail view of the ratchet and coacting pawls for feeding or advancing the receipt material.

Fig. 10 is a detail view illustrating the feed rolls and coacting pressure rolls for advancing the receipt material.

Fig. 11 is a detail view of the mechanism for latching the receipt pressure rolls in ineffective position.

2

Figure 1:
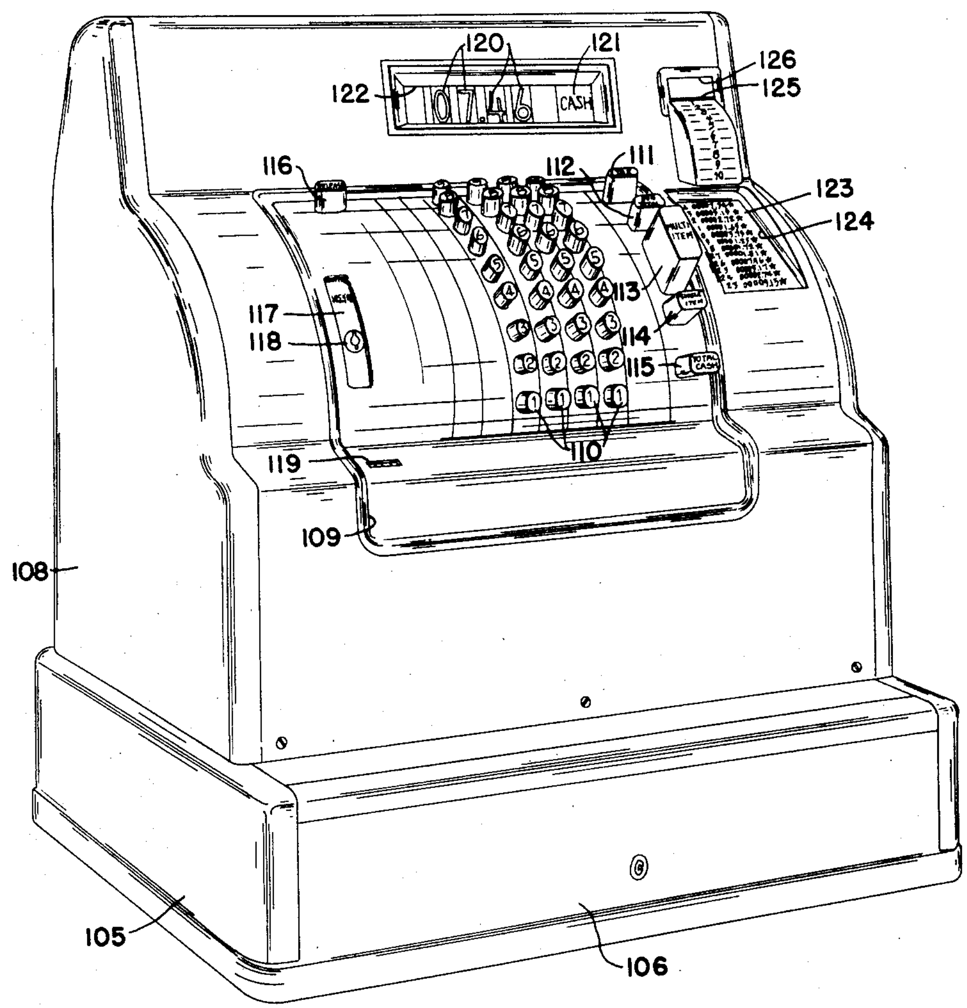
Fig. 1 is a perspective view of a machine embodying the various features of the present invention.

Fig. 12 is a right side elevation showing in particular the electro and date printing mechanisms for the receipt.

Fig. 13 is a detail view of the impression hammer for printing amounts on the receipt material.

The machine chosen to illustrate the present invention has many basic principles and features which are similar in many respects to those of a well-known type of cash register, which is fully disclosed in the following United States patents: No. 1,816,263, issued July 28, 1931; No. 1,929,652, issued October 10, 1933; No. 2,048,200, issued July 21, 1936; and No. 2,056,485, issued October 6, 1936, all to William H. Robertson.

Reference may be had to the above-listed patents for a history of the development of the pioneer machines of this type and for a full disclosure of mechanism used in the present machine, similar to those of the pioneer or basic machines, and which for that reason will be described only in general terms in the present application.

MACHINE IN GENERAL AND ITS SUPPORTING FRAMEWORK

The mechanism of the machine is supported primarily by a right frame 100 (Figs. 1 and 2) and its corresponding auxiliary frame 102, secured to the upper end of said right frame, and by a similar left frame (not shown) and its corresponding auxiliary frame (not shown). The right and left main frames are secured at their lower ends to a base plate (not shown), which is secured in a shallow pan (not shown), in turn secured to the top of a drawer cabinet 105 (Fig. 1), which has mounted therein a cash drawer 106, which opens automatically at the end of certain machine operations, as will be explained later. The right and left side frames are maintained in proper spaced relationship to each other by the base plate and by a back plate and various cross bars, plates, rods, and shafts, as shown best in Fig. 2.

The mechanism of the machine is enclosed in a suitable case or cabinet 108 (Fig. 1), made of sheet metal or other suitable material, secured to the machine base, and said cabinet has a large opening 109 in its front to provide proper clearance for the keyboard mechanism.

The keyboard of the machine comprises four rows of amount keys 110 (Fig. 1), a row of control keys 111 to 115 inclusive, a release key 116, for manually releasing any of the depressed amount keys and certain of the control keys, and a total control lever 117, which is movable to various positions to control the functions of the machine. The keyboard of the machine likewise includes a special step-by-step counter 119, which accumulates "1" for each time the total control lever 117 is moved to Reset position to select and condition the group totalizer for a reset or clearing operation.

Each of the rows of amount keys 110 has associated therewith corresponding amount differential mechanism (not shown), which causes the amount set up on said keys to be entered in the selected totalizer, and in turn said differential mechanism positions corresponding front and back indicators 120 (Fig. 1), only the front indicators being shown here. Likewise the control keys 111 to 115 have associated therewith corresponding transaction differential mechanism for positioning corresponding front and back transaction indicators 121, according to the depressed control keys, for the purpose of visibly indicating the type of transaction being performed. The front and back indicators are visible through corresponding openings 122 (Fig. 1) in the case 108, only the front opening being shown here. In addition to positioning the indicators, the amount differential mechanisms and the transaction differential mechanisms position corresponding type wheels for printing values corresponding to the depressed amount keys, and for printing symbols corresponding to the effective control keys, upon a detail strip 123, a portion of which is visible through a corresponding opening 124 in the case 108, and upon an issuing receipt 125, which is fed through a corresponding opening 126 in the upper portion of the case 108, said opening 126 being provided with a fine-toothed tearing blade for separating the finished receipt from its web.

The present machine is provided with two sets of totalizer wheels (not shown), mounted side by side upon a common axle. One of said sets of totalizer wheels will be referred to hereinafter as an item totalizer and the other as a group or storage totalizer for the accumulation of amounts cleared from the item totalizer. The wheels of the totalizers are shiftable laterally for alinement with the amount actuators under influence of the control keys 111 to 115, which keys also condition the totalizers for the type of operation corresponding to said keys.

The item totalizer is always cleared at the end of multiple-item transactions, and the amount cleared therefrom is simultaneously entered additively in the wheels of the storage totalizer. The storage or group totalizer may be selected and conditioned for reading and resetting, or subtotal and total operations, these terms being used interchangeably herein, by moving the total control lever 117 (Fig. 1) to read or reset position, respectively. Normally the total control lever 117 is located in Register position, as shown here, which causes the machine to function in a normal manner under control of the control keys 111 to 115. When it is desired to render the machine inoperative, for any reason, the total control lever 117 may be moved to Locked Register position, said total control lever being provided with a lock 118, which permits it to be locked in either Locked Register position or Register position. It is, therefore, impossible for those not having keys to the lock 118 to move the total control lever 117 from one position to another. The total control lever 117 is also normally locked against movement into Reset position, a special reset key for the lock 118 being required for unlocking the lever so that it may be moved to this position, and it is, therefore, impossible for those not having a reset key to move the total control lever to Reset position to reset or clear the amount from the group totalizer. As previously explained, each time the total control lever 117 is moved to Reset position, "1" is added in the reset counter 119 to provide an accurate record of the number of times the group totalizer is reset.

Mechanism pertinent to the present invention will be described in detail in the ensuing pages. Reference may be had to the patents referred to at the beginning of this specification for a full disclosure of other mechanism of the machine.

Reference may be had to the parent application, Serial No. 341,633, filed March 11, 1953, by Frank R. Werner et al., for a more complete description of mechanism not pertinent to the present invention and which for that reason is described only in a general manner herein.

DETAILED DESCRIPTION

*Receipt-material-feeding mechanism*

The receipt material 125 is in the form of a large supply roll 751 (Fig. 2) having a wooden core which fits over a supply roll sleeve 752 free on a stud carried by a supply roll support plate 753, shown here in dot-and-dash lines, which plate is secured to the main frame 100 by several studs and screws, so that said plate 753 and the receipt supply roll 751 may be readily removed from the machine to give access to the mechanism located behind said plate, The sleeve 752 for the receipt supply roll 751 is provided with a spring take-up device (not shown), which assists in maintaining the web of the receipt material taut, so that it will feed properly and will not interfere with closely related parts, or rub against an inking ribbon 697, which is threaded between the type carriers and the receipt material web 125 (Fig. 2). The web of the receipt material 125 is unwound from the supply roll 751 and threaded through an open guide slot formed by a properly bent bracket 754 secured to a ribbon frame support plate (not shown), thence over a ribbon shield 732, thence between feeding rollers 755 and coacting pressure rollers 756. The end of the receipt web 125 is finally directed through the opening 126 in the cabinet 108 (Fig. 1), the edge of which is provided with a tearing blade for separating the finished receipts from the web.

There are two of the receipt rollers 755 (Figs. 2 and 10), which are spaced apart approximately the width of the receipt material, and likewise there are two of the pressure rollers 756 coacting with said feed rollers, the two feed rollers and the two pressure rollers being in fixed lateral relationship to each other. Also integral with the feed roller 755 is a gear 758, said rollers and said gear being free on a stud 757 extending between the frame 102 and a receipt frame 615 attached in proper spaced relationship to said frame 102 (Fig. 2). The teeth of the gear 758 mesh with the teeth of a drive gear 759, having integral therewith a retaining ratchet 760 and a fine-toothed feed ratchet 761, said parts being free on a stud 762 extending between the frames 102 and 615. The teeth of the feed ratchet 761 (Fig. 9) are engaged by the teeth of two feed pawls 763 rotatably mounted on a disk 764 free on the stud 762, and by the teeth of two retaining pawls 765 pivoted on studs secured in the frame 102. The feed pawls 763 and the retaining pawls 765 are spring-urged into yielding engagement with the teeth of the ratchet 761. The disk 764 (Figs. 8 and 9) has a notch engaged by a stud 766 in a crank 767 secured to a gear 768 free on the stud 762. The gear 768 meshes with teeth in the upper periphery of a segment 769 (Figs. 7 and 8) free on a stud 770 secured to the inner surface of the frame 102. A downward extension of the segment 769 is slotted to receive a stud 772 in a crank 773 free on a stud 774 secured in the frame 102. The upper end of a pitman 775 is pivotally connected to the crank 773, while the lower end of said pitman has therein an opening 776 (Fig. 7) with several operating surfaces or steps which cooperate with a roller 777 free on a stud 778 carried by a cam lever 779 pivotally supported by a stud 780 in the frame 100. The lever 779 carries rollers 781 and 782, which cooperate, respectively, with the peripheries of companion plate cams 783 and 784, secured in fixed relationship to each other and rotatably supported on a stud 787 secured in the frame 100. The cams 783 and 784 are driven one clockwise revolution each machine operation.

The pitman 755 (Figs. 2, 6, and 7) is pivotally connected by a link 790 to a stud 726 in a control lever 791 free on a stud 706 in the frame 100, and said lever is urged counter-clockwise by a spring 793 to normally maintain a roller 792, carried thereby, in yielding engagement with the periphery of a plate cam 709 free on a stud 711 in the frame 100, which cam makes one counter-clockwise revolution each machine operation to rock said lever 791 first counter-clockwise and then back to normal position. The lever 791 has on its upper end a bent-over ear 794, which cooperates with the periphery of a control disk 700 (Fig. 6) rotatably mounted on a stud 701 secured in the frame 100. The disk 700 has secured thereto an upwardly-extending leg 702, having a surface 703 arranged to sense for and engage a stud 164 in the depressed control keys 111 to 115 inclusive, each of which keys carries one of said studs 164. The disk 700 has a slot engaged by a stud 704 in the upper end of a lever 705 free on the stud 706. A spring 707 urges the lever 705 clockwise to normally maintain a roller 699, carried thereby, in yielding engagement with the periphery of a plate cam 708 secured in fixed relation to the companion plate cam 709 and a gear 710, said parts being rotatably supported on the stud 711. The gear 710 meshes with a gear (not shown) which drives it and the cams 708 and 709 one counter-clockwise revolution each machine operation.

Operation of the cam 708 permits the spring 707 to rock the lever 705 clockwise, said lever in turn rocking the disk 700 and the leg 702 counter-clockwise to cause the surface 703 on said leg to sense for the stud 164 in the depressed control keys 111 to 115. Contact of the surface 703 with the stud 164 in the depressed control key positions the disk 700 accordingly.

The ear 794 also cooperates with the periphery of a control segment 795 (Fig. 7) free on the stud 701 and having teeth in an arcuate upper surface thereof which mesh with a gear 796 secured to a companion gear 797 free on a shaft 798 journaled in the machine framework (Fig. 2). The gear 797 meshes with external teeth of a transmission gear 799 having internal teeth which bear on the periphery of a corresponding disk 800 supported by a shaft 265 supported by the machine framework. The internal teeth of the gear 799 mesh with an idler pinion 266, which in turn meshes with a corresponding pinion 266 on a corresponding one of a series of square shafts 267 supported by disks similar to the disk 800.

The square shaft 267 for the gear 799 (Figs. 5 and 6) is operatively connected by two pinions 266 to a transmission segment 263 for the total control lever 117. The external teeth of the segment 263 mesh with upper teeth in a segment 801, free on a shaft 262 supported by the main frames, and having lower teeth which mesh with corresponding teeth cut in an arcuate upper surface of the total control lever 117. It should be evident from the preceding description that the total control lever 117 is operatively connected to the control segment 795 (Figs. 5 and 6) and that the movement of said total control lever 117 in turn moves said segment 795 in unison therewith and in relation thereto to position a control slot 802 in said segment in relation to the ear 794 of the lever 791. When the total control lever 117 is in Register position, as shown here, the slot 802 is alined with the ear 794, so that operation of the lever 791, under influence of the cam 709, is not interfered with, and said lever is free to control the operation and positioning of the pitman 775, as will be explained presently.

Moving the total control lever 117 away from Register position moves the slot 802 out of alinement with the ear 795 and moves an arcuate solid portion of said segment into the path of said ear to obstruct movement of the lever 791, under influence of the cam 709. Consequently the pitman 775 is retained in its extreme counter-clockwise or right-hand position (Fig. 7), in which position a clearance portion of the opening 776 is in alinement with the roller 777, and consequently no feeding movement is imparted to the receipt feeding mechanism under these conditions.

Means under control of an On-and-Off knob 803 (Figs. 2 and 12) is provided for rendering the receipt-feeding mechanism operative or inoperative, as required. The On-and-Off knob 803 is secured on the upper end of a shaft 618 journaled in the machine framework, where it is accessible for manipulation through an opening in the ribbon framework. Secured on the inner end of the shaft 618 is a crank 804 (Figs. 7 and 12), having pivotally connected thereto the upper end of a link 805, the lower end of which is pivotally connected to a blocking arm 806. When the knob 803 is in "On" position, as shown here, the arm 806 is out of the path of the ear 794 on the lever 791 and consequently does not interfere with operating movement of said lever. Moving the knob 803 from "On" position to "Off" position, through the shaft 618, the crank 804, and the link 805, shifts the blocking arm 806 downwardly into the path of the ear 794 to obstruct operating movement of the lever 791, and, as a result, the pitman 755 is retained in ineffective position, where no feeding movement is imparted thereto by the cam lever 779. A spring-actuated retaining pawl (not shown) cooperates with a retaining projection (not shown) on the crank 804 (Fig. 12) to retain said shaft and connected parts in either of their two positions.

Means is provided for locking the On-and-Off knob 803 in either of its two positions when the total control lever 117 (Fig. 5) is in either Register or Locked Register position.

The link 805 (Figs. 7 and 12) carries a stud 807 arranged to be engaged by either of two locking notches in an upwardly-extending arm 808 of a yoke 809, free on the shaft 798, said notches corresponding to the "On" and "Off" positions of said link and the knob 803. The arm 808 of the yoke carries a stud 810, engaged by a slot in a plate 811 (Fig. 7) pivoted on a stud 812 in the frame 100. The plate 811 carries a roller 813, which engages a camming slot 814 in the segment 795, which, as previously explained, is positioned under control of the total control lever 117 (Fig. 5).

Figure 7:
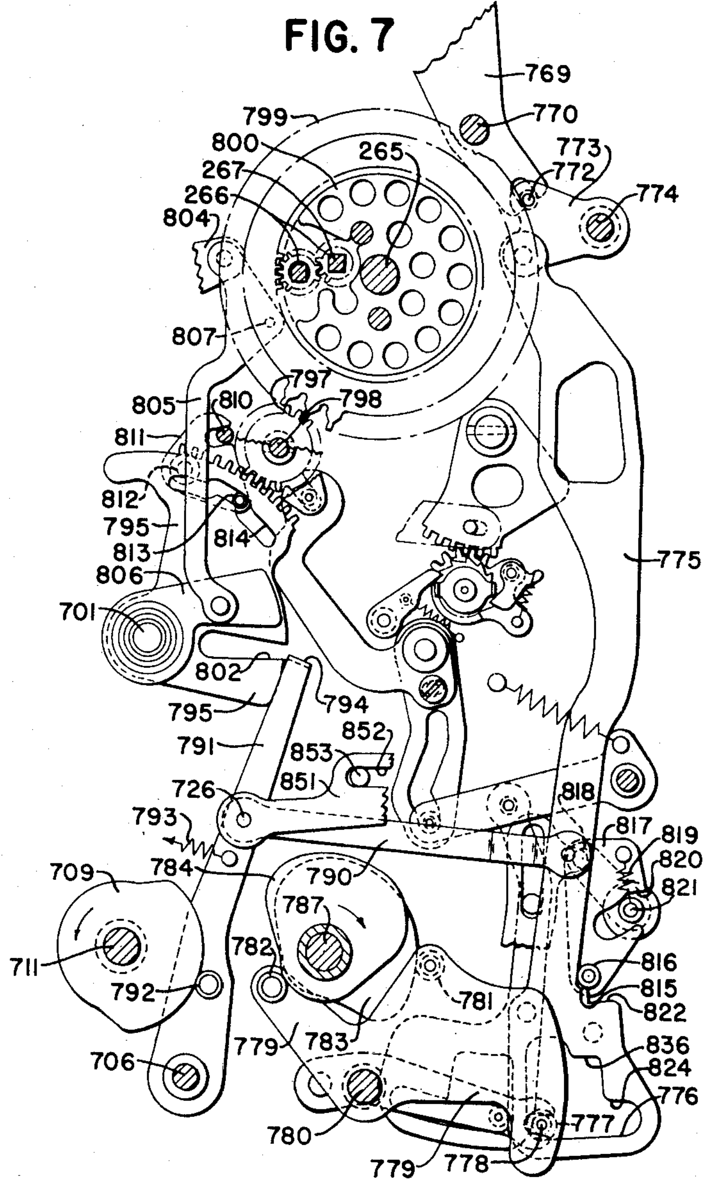
Fig. 7 is a right side elevation showing the consecutive-number-advancing mechanism and the mechanism for operating and controlling the operation of the receipt-feed mechanism.

When the total control lever 117 is in either Register or Locked Register position, an outer branch of the slot 814 engages the roller 813, as shown in Fig. 7, to cause one of the locking notches in the arm 808 (Fig. 12) to engage the stud 807 and lock the On-and-Off knob 803 and connected parts in either "On" or "Off" position, depending upon which position the knob is in at the time. Moving the total control lever 117 to any position except register and Locked Register position causes the inner branches of the slot 814, in cooperation with the roller 813, to rock the plate 811 clockwise, which, through the stud 810, rocks the yoke 809 counter-clockwise to disengage the notches in the arm 808 from the stud 807, to free the On-and-Off knob 803 for movement from one position to another. Integral with the crank 804 (Fig. 12) is a printing member 898, which is moved to printing position when the knob 803 is in "Off" position to print a series of dashes (not shown) on the detail strip 123 (Fig. 1) in operations in which no receipt is issued.

Using either the Tax key 111 or the Multiple-Item key 113 (Fig. 6) to initiate machine operation causes the disk 700 to be so positioned that the corresponding one of intermediate surfaces 788 or 789 thereon is positioned opposite the ear 794 on the lever 791. Operation of the cam 709 (Figs. 6 and 7) permits counter-clockwise movement of the lever 791, under influence of the spring 793, until the ear 794 contacts the selected one of the intermediate surfaces 788 or 789. This, through the link 790, positions the pitman 775 so that an operating surface 836 in the opening 776 is in the operating range of the roller 777. Clockwise positioning movement of the pitman 775 likewise disengages a step 815 on its back surface from a stud 816 in a plate 817 pivotally mounted by means of a stud 818 carried thereby, in cooperation with a corresponding bushing in the frame 100 (Fig. 2). As the lower end of the pitman 775 moves clockwise or forwardly, a spring 819 carries the plate 817 clockwise in unison therewith until a stop surface 820, formed in an opening in said plate, contacts a stud 821 fast in the frame 100, to disengage the stud 816 from the step 815, and to simultaneously bring said stud into alinement with a stop surface or step 822 formed on the pitman 775 adjacent the step 815. Operation of the lever 779 by the cams 783 and 784 causes the roller 777 to engage the surface 836 and carry the pitman 775 upwardly a slight distance until such upward movement is terminated by the stud 816 contacting the step 822 (Fig. 7).

The above-explained minimum movement upward of the pitman 775, through the crank 773, rocks the segment 769 a slight distance counter-clockwise, which movement, through the gear 768 (Figs. 8, 9, and 10), revolves the disk 764 clockwise, or in a take-up direction, during which time the feed pawls 763 ratchet over the teeth of the ratchet 761. Clockwise return movement of the lever 779 causes the roller 777 to engage the bottom surface of the opening 776 (Fig. 7) and restore the pitman 775 downwardly, which movement causes the disk 764 to be rotated in a counter-clockwise or feeding direction to advance the ratchet 761, the gears 759 and 758 (Fig. 10), and the feed rolls 755 in a feeding direction to line-space the receipt material 125 (Fig. 1) for the proper printing of the tax or multiple items thereon. Downward restoring movement of the pitman 775 causes the stud 816 (Fig. 7) to again engage the step 815 on the rear edge of said pitman, in preparation for the next multiple-item operation.

Each series of tax operations or multiple-item operations, under influence of the control keys 111 and 113, is followed by a Total Cash operation, under influence of the Total Cash control key 115 (Figs. 1 and 6), during which operation the item totalizer is cleared and the total amount therein is simultaneously transferred to the storage totalizer. The Total Cash key 115 positions the lever 702 and the control disk 700 so that a low portion 823 of its periphery is opposite the ear 794. This permits full counter-clockwise movement of the lever 791, under influence of the cam 709 and the spring 793 (see also Fig. 7). Full counter-clockwise movement of the lever 791, through the link 790, shifts the pitman 775 full distance forwardly, or clockwise, to move an operating surface 824 in the rear end of the opening 776 above the roller 777 and to move the surface 822 out of the path of the stud 816. After the pitman 775 has thus been positioned in relation to the roller 777, operation of the lever 779, under influence of the cams 783 and 784, causes said pitman 775 to be shifted full distance upwardly, or in a take-up direction, to impart maximum take-up movement to the segment 769 (Fig. 8), the disk 764, and the feed pawl 763 (Figs. 9 and 10). Clockwise return movement of the lever 779 (Fig. 7) restores the pitman 775 downwardly, which movement, through the segment 769 (Fig. 8), restores the disk 764, the feed pawls 763, the ratchet 761, and the feed rolls 755 (Fig. 10) in a feeding direction, to advance the receipt material 125 (Fig. 1) full distance in Total Cash operations. This full advancement of the receipt material is necessary to provide room for printing of the total of the multiple items, the consecutive number, the date, and the data on the electro on said receipt material, as will be explained presently, in connection with the receipt hammer mechanism.

Depression of the Single Item key 114 (Figs. 1 and 6), to initiate a single-item operation, causes the disk 700 to be so positioned that the low surface 823 is opposite the ear 794, and, consequently, the lever 791 is free to move full distance counter-clockwise to position the pitman 775 (Fig. 7) in exactly the same manner as explained above, in connection with Total Cash operations, to cause full or long feeding movement to be imparted to the receipt material 125 for the printing of all the required data thereon.

Depression of the Sub-Total key 112 (Figs. 1 and 6) causes the disk 700 to be positioned so that a high portion 825 of its periphery is opposite the ear 794; consequently, counter-clockwise movement of the lever 791 is obstructed, and the lower end of the pitman 775 is retained in the position shown in Fig. 7, in which the widest portion of the opening 776 is in alinement with the roller 777. With the opening 776 thus positioned in relation to the roller 777, operation of the lever 779 imparts no movement to the pitman 775, and, consequently, the receipt material 125 will not be fed. In sub-total operations, as will be explained later, the receipt hammer mechanism is rendered inoperative, and consequently no impression is made upon the receipt material. This is why it is unnecessary to feed said material during such operations.

By referring to Figs. 2 and 10, it will be recalled that the pressure rollers 756 maintain the receipt material 125 in yielding contact with the feed rollers 755, to effect the feeding of said receipt material. The pressure rollers 756 are turnably mounted on a spindle 829 secured in an arm 826 free on a stud 827 in the frame 102, and a spring 828 urges said arm 826 and said pressure rollers 756 clockwise to normally maintain said rollers in yielding contact with the feed rollers 755.

A latching mechanism is provided for latching the pressure rollers 756 in open position against the action of the spring 828, whenever this is desirable or necessary, one such occasion being when the receipt material 125 is being threaded in the machine. The outer end of the spindle 829 is undercut to ride freely in an arcuate slot 830 (Fig. 1) in an upward extension of a ribbon support plate 727, and coacting with said outer end of the spindle is a latch 831 pivoted on a stud 832 secured in said plate 727. A spring 833, tensioned between the stud 834 fast in the lower end of the latch 831 and a stationary stud in the plate 727, urges said latch 831 counter-clockwise to normally maintain said stud 834 in yielding contact with a stop surface formed on said plate 727.

The latch 831 is provided with a fingerpiece 835 for moving said latch clockwise against the tension of the spring 833 until a latching hook formed on its upper end is out of the path of the spindle 829, whereupon said spindle and the arm 826 may be moved down, or counter-clockwise, to disengage the pressure rollers 756 from the feed rollers 755, after which said latch 831 may be released to permit the spring 833 to return its hook-shaped upper end over said spindle 829 to secure said spindle and the pressure rollers 756 in disengaged position against the action of the spring 828. When the pressure rollers 756 are in effective position, as shown in Figs. 10 and 11, the arcuate upper end of the latch 831 moves beneath the spindle 829 to prevent accidental or unintentional movement of said pressure rollers to ineffective position, and consequent release of the receipt material 125 to the action of the automatic take-up device, which would instantly rewind said receipt material.

The receipt feed rolls 755 (Figs. 2 and 10) are secured against feeding movement, when the machine is at rest, by means of a pawl 939, which engages the teeth of the ratchet 760, as shown here, said pawl being pivotally mounted on a stud 940 secured in the frame 102. A spring 941 urges the pawl 939 clockwise to normally maintain a bent-over ear 942 thereon in yielding engagement with a stud 943 in the segment 769. When the segment 769 is in normal or home position, as shown here, the stud 943 maintains the pawl 939 in engagement with the teeth of the ratchet 760 against the tension of the spring 941, to secure said ratchet and, through the gear 759, the feed rolls 755, against feeding movement when the machine is at rest. It will be noted by referring to Figs. 9 and 10 that the retaining pawls 765, in cooperation with the teeth of the ratchet 761, retain the feed rolls 755 against retrograde movement at all times. Counter-clockwise initial movement of the segment 769, to rotate the disk 764 and the feed pawls 763 in a take-up direction, withdraws the stud 943 (Fig. 10) from the ear 942 and frees the pawl 939 to the action of the spring 941, which immediately disengages said pawl from the teeth of the ratchet 760 to free said ratchet and connected parts for feeding movement. As the segment 769 nears the end of its return movement in a clockwise direction, the stud 943 engages the ear 942 to rock the pawl 939 into engagement with the teeth of the ratchet 760 to secure said ratchet and the feed rolls 755 against feeding movement when the machine is at rest.

It will be recalled by referring to Fig. 2 that the sleeve 752, which supports the receipt supply roll 751, is provided with a spring take-up mechanism which tends to rotate said supply roll in a take-up direction, or in a direction contrary to the feeding movement of said supply roll, to retain the web of the receipt material 125 taut at all times, and to provide a safeguard against tampering with the receipt material through the receipt opening 126 (Fig. 1) in the cabinet 108. Any attempt to tamper with the receipt material—for example, by prying the tension rollers 756 out of engagement with the feed rollers 755—will immediately free the web of the receipt material 125 and the supply roll 751 (Figs. 2 and 10) to the action of the take-up spring in the sleeve 752. The take-up spring instantly rewinds the receipt material within the machine to a point where it may not again be threaded between said feed and tension rolls without the opening of the closure on the right-hand side of the cabinet, which gives access to the receipt-feeding mechanism, said closure being normally locked and the keys thereto being usually possessed by some person in authority.

*Receipt-printing mechanism*

The receipt-printing mechanism is supported by a framework comprising a front frame 613 (Figs. 2, 12, and 13), secured to the frame 102; an auxiliary frame 614, secured to the frame 613; and a front frame 615, secured in proper spaced relationship to the frame 102 by various rods, studs, and screws.

The receipt-printing mechanism includes a series of amount type wheels 619 (Fig. 2) free on a stud 620 supported between the frames 613 and 614, date wheels 625, and consecutive number wheels (not shown) free on a stud 626 also supported between the frames 613 and 614 for printing corresponding data on the receipt material 125 to produce either a single-item receipt 609 (Fig. 4) or a multiple-item receipt 610 (Fig. 3).

The receipt amount type wheels 619 (Figs. 2 and 13) cooperate with a platen 838 of a receipt hammer in the form of a yoke 839, the side arms of which are pivotally supported on the stud 774. A spring 840 urges the hammer 839 upwardly, or clockwise, to normally maintain an adjustable cone 841, carried thereby, in yielding engagement with the surface of a hammer-operating cam 842 free on a stud 843 secured in the frame 102. Integral with the cam 842 is an arm 844 carrying a stud 845 engaged by a slot in one arm of a yoke 846 free on the stud 774, the other arm of said yoke 846 carrying a stud 847 pivotally supporting the upper end of a pitman 848. The pitman 848 has a slot (not shown) in its lower end, which engages a stud (not shown) in a link 851 (Fig. 6), the forward end of which is pivotally mounted on the stud 726 in the lever 791 (Figs. 6 and 7). The lower end of the pitman 848 has an opening (not shown) through which extends a roller (not shown) carried by a cam lever (not shown) which coacts with surfaces in said opening in the pitman 848, for operating the impression hammer 839 under the influence and control of a hammer-operating cam (not shown).

In addition to the amount, date, and consecutive number type wheels, the machine is provided with an electro 859 (Figs. 2 and 12) for printing data of an informative or other nature upon the receipts. The electro 859 is located between the amount type wheels 619 and the date wheel 625, and is supported by the frames 613 and 614. Cooperating with the electro 859, the date wheel 625, and the consecutive number wheel (Fig. 12) is a platen 860 of a printing hammer 861 pivotally supported on a stud 862 extending between the parallel side arms of a yoke 863 free on the stud 762. A spring 864 urges the yoke 863 counter-clockwise to normally maintain a roller 865, carried by the stud 862, in yielding contact with the operating surface of a cam 866 free on the stud 843, and connected by a bail to a companion arm 867. The arm 867 carries a stud 868, which engages a slot in the upper end of an arm 869 free on the stud 774 and fixed to a companion arm 870, to which is pivotally connected the upper end of an operating pitman 871. The lower end of the pitman 871 has an opening (not shown) with control surfaces therein, which cooperate with the roller in the lever for operating pitman 848 and the amount hammer 839, in the manner explained before. A spring 874 (Fig. 12) maintains the hammer 861 for the electro, and also the date and consecutive number type wheels, in substantial alinement therewith, and forms a flexible connection which permits said hammer to adjust itself during operation to properly impress the receipt material 125 against said electro and said type wheels.

The use of either the Tax key 111 or the Multiple Item key 113 (Fig. 6) to control machine operation causes the disk 700 to be so positioned that the intermediate surfaces 788 or 789 thereon are opposite the ear 794 of the lever 791. Consequently, during tax and multiple-item operations, the counter-clockwise movement of the lever 791 is controlled by the surfaces 788 or 789, causing said lever, through the link 851, to position the pitmans 871 and 848 in their intermediate positions, in which position the pitman 848 is operable by its lever and cam mechanism and is shifted downwardly thereby against the action of a spring (not shown), which normally maintains said pitman in its upward position, to cause said pitman to rock the yoke 846 (Fig. 13) counter-clockwise. Counter-clockwise movement of the yoke 846, through the stud 845, rocks the arm 844 and the cam 842 clockwise, causing said cam, in cooperation with the cone 841, to rock the hammer 839 downwardly, or counter-clockwise, against the action of the spring 840, to cause said hammer to carry the receipt material 125 (Fig. 2) and the inking ribbon 697 into contact with the amount type wheels to print the value set up on said amount wheels on said receipt material. In operations controlled by the keys 111 and 113, the pitman 871 (Fig. 12) receives no movement, and the corresponding date and electro hammer 861 remains inoperative in such operations.

Following all multiple-item and tax operations, a Total Cash operation is performed under control of the Total Cash key 115 (Figs. 1 and 6) to print a total of the tax and other data upon the receipt. Depression of the Total Cash key 115 causes the disk 700 to be positioned so as to bring its low surface 823 opposite the ear 794 and thus permits full counter-clockwise movement of the lever 791 under control of its cam. Full counter-clockwise movement of the lever 791, through the link 851, shifts the pitmans 848 and 871 full distance forwardly to render both of said pitmans operable in Total Cash operations. Therefore, in Total Cash operations, printing movement will be imparted to the hammers 839 and 861 (Figs. 12 and 13). Return movement upwardly of the pitmans 848 and 871, after printing has been completed, permits the corresponding printing hammers to be spring-restored to ineffective or non-printing position. Single-item operations performed under control of the Single Item key 114 (Figs. 1 and 6) cause the disk 700 to be so positioned that the low surface 823 is opposite the ear 794, and consequently in such operations both of the pitmans 848 and 871 will be operated to cause both the hammers 839 and 861 to operate to print the data corresponding thereto on the receipt material 125.

Sub-Total operations, which are controlled by depression of the Sub-Total key 112, causes the disk 700 to be so positioned that the high surface 825 is opposite the ear 794 (Fig. 6); consequently counter-clockwise movement of the lever 791 is obstructed, and the pitmans 848 and 871 are retained in their rearward positions, resulting in no movement being imparted to said pitmans, and therefore in sub-total operations the hammers for the receipt material will remain inoperative.

Many of the structural details of the receipt printing and feeding mechanism described above are similar to the corresponding mechanism fully disclosed in the parent co-pending application for Letters Patent of the United States, Serial No. 341,633, filed March 11, 1953, by Frank R. Werner et al., to which reference may be had for a further and more complete description of said receipt feeding and printing mechanisms.

OPERATION

It is believed that sufficient knowledge of the operation of the machine chosen to illustrate the present invention will have been obtained from a perusal of the description, in conjunction with the drawings. Nevertheless, a brief statement of operation, using as a basis the receipts 609 and 610 shown in Figs. 3 and 4, may prove helpful and will now be given.

The machine chosen to illustrate the present invention is primarily what is termed an "Itemizing Cash Register," and one of several typical examples of the use of such a machine is in the checkout line of a self-serve food market or similar business.

The receipt 609, shown in Fig. 4, provides a typical example of a single-item transaction, in which a customer purchases one item, the value of which is $5.50. The customer presents this item to the cashier at the check-out counter, and, after making sure that the total control lever 117 is in Register position (Fig. 1), the cashier sets up the value of the item, $5.50, on the amount keys 110. Depression of the amount keys locks the total control lever against movement, after which the cashier depresses the Single Item key 114 to initiate a single-item transaction, during which the amount, $5.50, is entered in the storage totalizer and is simultaneously printed upon the receipt 609. The amount of the transaction, $5.50, and the consecutive number, 998, are also printed on the detail strip 123. The data appearing at the top of the receipt 609—that is, The John Doe Company; the consecutive number, 998; and the date, May 7—were printed during a preceding operation, as will be explained presently. Also, in single-item transactions, the electro, consecutive number, and date-printing mechanisms function to print the data "Thanks," "The John Doe Company," the consecutive number, and the date upon the web 125 of the receipt material, in preparation for the next receipt.

The finished receipt 609 is severed from the web 125 between the word "Thanks" and "The John Doe Company," and as a result said word "Thanks" appears near the bottom of the receipt 609, while the other data—The John Doe Company, the consecutive number 999, and the date, May 7—forms the heading for the multiple-item receipt 610 (Fig. 3), which was issued in the immediately-following operation.

In multiple-item transactions, a receipt similar to the receipt 610 (Fig. 3) is printed upon the receipt material 125 and is issued to the customer, who in such transactions presents the several items purchased to the cashier at the checkout counter, and the price of each item is entered on the amount keys 110. Then, in a series of multiple-item operations, these prices are simultaneously printed upon the recipt material, and are entered in the item totalizer. For example, the value of the first item, 50 cents, is entered on the amount keys 110 (Fig. 1), after which the multiple-item key 113 is depressed, and, during operation of the machine, the value of this item, 50 cents, is printed upon the receipt material 125, and said material is line-spaced or short-fed in the manner explained for multiple-item operations, in connection with Fig. 6. It will be recalled that the Multiple Item key 113 selects the item totalizer for actuation, and consequently the value of the item, 50 cents, is simultaneously entered in said item totalizer. The value of the second item, $1.00, is set up on the amount keys 110, after which the Multiple Item key 113 is again depressed to initiate a multiple-item operation, in which the value of the item is printed upon the receipt material and is simultaneously added into the item totalizer, and so on, for the other items.

It will be recalled that during multiple-item operations, which are a part of a complete multiple-item transaction, the printing mechanism for the detail strip 123 is rendered inoperative, and consequently such items are not printed upon the detail strip. However, there is one exception to this in the present arrangement, and that is Tax items, which are always printed upon the detail strip. It will be noted that in connection with the present multiple-item transaction there is a Tax item of 12 cents, and the amount of this item is set up on the amount keys 110, after which the Tax key 111 is depressed to initiate a tax operation, which is similar in every respect to a multiple-item operation, with the exception that the detail printing mechanism is rendered operative, and the amount of the tax, 12 cents, is printed upon both the detail strip 123 and the receipt material 125, and said tax is simultaneously entered in the item totalizer.

After all the items have been entered in the item totalizer, and simultaneously printed upon the receipt material 125, the multiple-item transaction is completed by performing a Total Cash operation, which is initiated by depression of the Total Cash key 115 (Figs. 1 and 6), which causes the item totalizer to be zeroized and the total amount therein, $3.12, to be transferred to the storage totalizer, and simultaneously printed near the bottom of the receipt 610. During the Total Cash operation, the receipt electro and date-printing mechanisms function to print the electro data, the consecutive number, and the date upon the receipt, in the manner explained in connection with the single-item receipt 609 (Fig. 4). Concurrently with the printing of the total of the amount, $3.12, at the bottom of the receipt, this amount is also printed upon the detail strip 123.

By referring to Fig. 3, it will be noted that the items of a multiple-item transaction are identified by a dash printed immediately to the right of said items. The tax items are identified by the word "Tax" printed immediately to the right thereof, and Total Cash and Single-Item entries are identified by a star printed to the right of said items.

If, at any time during a multiple-item transaction, the operator wishes to ascertain the total amount of the items listed or entered, this may be accomplished by initiating an Item Sub-Total operation through the depression of the Sub-Total key 112, and during this operation the item totalizer is sub-totalized and the amount therein set up on the indicators 120 (Fig. 1). However, the amount of the sub-total is not printed either upon the receipt or upon the detail strip.

While the forms of mechanism herein shown and described are admirably adapted to fulfill the objects primarily stated, it is to be understood that it is not intended to confine the invention to the forms or embodiments disclosed herein, for it is susceptible of embodiment in various other forms, all coming within the scope and the spirit of the invention.

What is claimed is:

1. In a machine of the class described, constructed and arranged to perform various types of operations and having printing means to print records of said operations on receipt material, the combination of means including feeding rollers and coacting pressure rollers to feed the record material; a ratchet device to drive the feeding rollers, said ratchet device having a variable retrograde take-up movement and a constant forward feeding movement to feed the receipt material different extents; means comprising a reciprocable member to operate the ratchet device in take-up and feeding directions; means to drive the member, said member constructed and arranged to be positioned in relation to said driving means to vary the degree of take-up movement imparted to said member and to the ratchet device to control the extent of feeding movement imparted to the feeding rollers by said ratchet device; control keys to initiate and control the various machine operations; a control disk positioned by the control keys and having graduated control surfaces thereon corresponding to said control keys; and means connected to the member and constructed and arranged to sense the graduated surfaces on the control disk to position said member in relation to the driving means, and in accordance with the effective control key, to regulate the degree of take-up movement of said member and the ratchet device to cause the record material to be fed an extent corresponding to said effective control key.

2. In a machine of the class described, capable of performing multiple-item transactions, which include a series of item-entering operations and a final total operation, said machine having printing means to print records of said operations upon receipt material, the combination of feed rollers and coacting pressure rollers to feed the record material in relation to the printing means; a ratchet device to turn the feed rollers to feed the record material; means including a member to operate the ratchet device; operating surfaces formed on said member and including a short-feed take-up surface, a long-feed take-up surface, and a feeding surface; regularly-excursioned operating means constructed and arranged to coact with the selected take-up surface during one excursion of its movement, and with the feeding surface during its other excursion of movement, to operate the ratchet device accordingly, to feed the record material; a multiple item control element; a total control element; a control disk positioned by the control elements, said disk having a short-feed control surface corresponding to the multiple item control element, and a long-feed control surface corresponding to the total control element; and sensing means connected to the member and arranged to sense the control surfaces on the disk to position the short-feed take-up surface on said member in coacting relationship with the operating means when the multiple item control element is effective, and to position the long-feed take-up surface on said member in coacting relationship with the operating means when the total control element is effective to cause the record material to receive a short feeding movement in multiple-item operations, and to receive a long feeding movement in total operations.

3. In a machine of the class described, constructed and arranged to perform multiple-item transactions, which include a series of item-entering operations and a final total operation, and having printing means to print records of said operations and other data on receipt material, the combination of means including feed rollers and coacting pressure rollers to feed the receipt material in relation to the printing means; a ratchet device for imparting feeding movement to the feed rollers; a rockable segment operatively connected to the ratchet device for operating said device in take-up and in feeding directions; means including a member connected to the segment; operating means for the member, said operating means having an invariable pattern of movement, first in a take-up direction and then in a feeding direction; operating surfaces formed on the member, including a short-feed take-up surface and a long-feed take-up surface arranged to coact with the operating means during its initial take-up movement, said operating surfaces also including a feeding surface arranged to coact with the operating means during its feeding movement; a multiple item control element; a total control element; a control disk positioned by the control elements; and sensing means connected to the member and arranged to sense the control disk, and effective when said disk is positioned by the multiple item control element to position the short-feed take-up surface on said member, in coacting relationship with the operating means to impart a short take-up movement to the feed rollers, in multiple-item operations, said sensing means effective when the disk is positioned by the total control element to position the long-feed take-up surface on said member in coacting relationship with the operating means to impart a long take-up movement to the feed rollers in total operations, to feed the receipt material a short extent in multiple-item operations and a long extent in total operations.

4. In a machine of the class described, having printing means for printing records on receipt material and constructed and arranged to perform various types of operations, the results of certain of said operations being recorded on said receipt material, the combination of means including feed rollers and coacting pressure rollers to feed the receipt material in relation to the printing means; a ratchet device for operating the feed rollers; a feed segment connected to the ratchet device; a member operatively connected to the segment; operating means for the member, said operating means movable from a normal or extreme fed position first in a take-up direction and then back to normal position; control surfaces formed in an opening in the member adjacent to a clearance portion of said opening, said control surfaces including a feeding surface engageable by the operating means when in normal position to retain said member and connected parts in extreme fed position when the machine is at rest, said control surfaces also including graduated take-up surfaces engageable by the operating means when it is moving in a take-up direction to impart different extents of take-up movement to said member and connected parts; a plurality of operable control elements; a control disk positioned by the control elements; and sensing means connected to the member and coacting with the control disk to position said member according to the position of said disk, and thereby to control the positioning of the clearance portion and the graduated take-up surfaces in relation to the operating means to retain said member and connected parts inoperative or to determine the extent of take-up and feeding movement imparted to said member and connected parts by the operating means, to control the receipt-feeding mechanism in accordance with the type of operation being performed under control of the effective control element.

5. In a machine of the class described, constructed and arranged to perform various types of operations and having printing means to print records of said operations and other data on receipt material, the combination of means including feed rollers and coacting pressure rollers to feed the receipt material in relation to the printing means; a ratchet device for operating the feed rollers; means including a segment for operating the ratchet device; a member connected to the segment; operating surfaces formed in an opening in the member; operating means to coact with the operating surfaces to operate the ratchet device and the feeding rollers different extents to control the feeding of the receipt material according to the type of machine operation being performed; a plurality of control elements to initiate and control the various types of machine operations; a control disk positioned by the control elements; and sensing means connected to the member and constructed and arranged to sense the control disk to position the operating surfaces in proper relationship with said operating means to control the extent of operation of the ratchet device and the feed rollers, in accordance with the type of operation initiated and controlled by the effective control element.

References Cited in the file of this patent

UNITED STATES PATENTS

| | | |
|---|---|---|
| 2,035,095 | Racz | Mar. 24, 1936 |
| 2,202,596 | Muller | May 28, 1940 |
| 2,341,630 | Lambert | Feb. 15, 1944 |